United States Patent [19]
Pieper

[11] Patent Number: 5,848,540
[45] Date of Patent: Dec. 15, 1998

[54] STEERING COLUMN LOCK FOR MOTOR VEHICLES

[75] Inventor: Friedrich Pieper, Töging, Germany

[73] Assignee: Huf Hulsbeck & Furst GmbH & Co KG, Velbert, Germany

[21] Appl. No.: 876,202

[22] Filed: Jun. 16, 1997

[30] Foreign Application Priority Data

Jun. 24, 1996 [DE] Germany .................. 29 611 043.4

[51] Int. Cl.⁶ .................................................. B65R 25/02
[52] U.S. Cl. .............................. 70/252; 70/360; 70/370; 70/371
[58] Field of Search ............................ 70/252, 360, 370, 70/371, 375 R, 379 A, 380, 182–186, 448, 451

[56] References Cited

U.S. PATENT DOCUMENTS

| | | | |
|---|---|---|---|
| 3,590,611 | 7/1971 | Nakashima | 70/186 |
| 3,782,145 | 1/1974 | Wolter | 70/186 |
| 4,987,756 | 1/1991 | Fancher | 70/186 |

FOREIGN PATENT DOCUMENTS

| | | | |
|---|---|---|---|
| 0094568 | 11/1983 | European Pat. Off. | 70/252 |
| 2029547 | 12/1971 | Germany | 70/252 |
| 2713381 | 9/1977 | Germany | 70/360 |
| 2633796 | 2/1978 | Germany | 70/252 |
| 2231085 | 11/1990 | United Kingdom | 70/252 |

*Primary Examiner*—Darnell M. Boucher
*Attorney, Agent, or Firm*—Bacon & Thomas, PLLC

[57] ABSTRACT

A motor vehicle steering column lock includes a drove rod element extending axially along a bore within the housing of the steering column lock for actuating a steering column locking bolt member in accordance with known steering column lock mechanisms. The drive rod element of the steering column lock is provided with a radial projection that cooperates with a radial wall of an enlarged recess of the bore extending through the lock housing for preventing axial withdrawal of the drive rod element from the housing and also includes an axial locking projection that is spring biased into a locking recess for preventing relative rotation between the drive rod element and the housing when the steering column lock is transported or stored without a lock cylinder installed in the housing.

8 Claims, 6 Drawing Sheets

STEERING COLUMN LOCK FOR MOTOR VEHICLES

BACKGROUND OF THE INVENTION

1. Field of the Invention

This invention concerns a steering column lock for motor vehicles.

2. Discussion of Related Technology

Motor vehicle steering column locks are known and have been described in the patent literature (see, for example, German Patent No. 25 01 245 A1-FIG. 9). In such steering column locks, the steering shaft locking member consists of a locking bolt movable from inside the steering column lock housing and which is displaceable transversely relative to the steering column lock drive mechanism to lock the steering column (i.e., the stearing shaft thereof) in response to a spring-biasing force that normally biases the locking bolt towards the locked position. The locking bolt may be driven out of the locked position by the steering column lock drive element which urges the locking bolt against its spring biasing force and holds it in an unlocked position when the steering shaft of the steering column is unlocked.

To secure the lock drive element of the steering column lock in the steering column lock housing when the key lock cylinder is not assembled to the lock mechanism, the lock drive element is provided with a radial projection that may be rotated inside the steering column lock housing and within an inner enlarged annular recess into a position whereat the projection is spaced from an inner axial channel of the steering column lock housing accommodating the projection during assembly of the lock drive element in the housing and where at the projection is located such that the projection interferes with axial movement of the lock drive element out of the housing. The lock drive element is normally held in this rotated position by the steering shaft locking bolt which is spring-loaded against the lock drive element.

However, apart from the force of the spring-loaded steering shaft locking bolt against the lock drive element, there is no other mechanism provided to prevent inadvertent rotation of the lock drive element into a position whereat it may be escape from the interior of the steering column lock housing when a key lock cylinder is not secured in the housing.

BRIEF SUMMARY OF THE INVENTION

The object of this invention is to provide a steering column lock for motor vehicles wherein the lock drive element for the steering shaft locking bolt is fixed against angular rotation as well as axial displacement in the steering column lock housing even when a key lock cylinder is not provided in the housing.

In accordance with the invention, a motor vehicle steering column lock is provided that cooperates with a steering shaft locking member or bolt, the steering column lock comprising a housing including an axial bore, an ignition switch receiving area at one end of the bore and a lock cylinder receiving area at the other end of the bore, with the lock cylinder receiving area forming an extension of the axial bore. A peripheral annular enlarged recess is provided along the bore, the annular recess including a radial wall on one side thereof that is located away from the ignition switch receiving area of the housing. An axial channel is provided extending along a side wall area of the bore that extends generally from the lock cylinder receiving area of the housing to the annular enlarged recess, with the channel intersecting the recess at the aforesaid radial wall.

A locking projection engaging recess is provided in the bore intersecting the radial wall of the enlarged annular recess at a point circumferentially spaced from the intersection of the channel with the radial wall, preferably 180° apart. A lock drive rod element is supported in the bore for axial and rotational motion and includes a radial projection projecting radially into the enlarged annular recess. The axially extending channel has a width sufficient to accommodate axial passage of the projection along the bore when the lock drive rod element is axially inserted into the bore from the lock cylinder receiving end thereof. However, the radial projection, once it is rotated out of registration with the channel, is restrained from axial motion beyond said radial wall of the enlarged annular recess in the direction of the lock cylinder receiving end of the housing by interference between the radial wall and the radial projection. An axially extending locking projection is associated with the radial projection and engages the locking projection engaging recess in the radial wall of the enlarged annular recess when the radial projection is rotated to align the locking projection with the recess. A spring element is provided for biasing the lock drive rod element away from the ignition switch receiving area of the housing towards the key lock cylinder receiving end thereof and this spring element urges the locking projection into engagement with the locking projection receiving recess when the locking projection is rotated into a position such that it is in alignment with the recess.

In this position, the lock drive rod element is restrained against axial motion out of the axial bore of the steering column lock housing and is also restrained against rotation into a position where the radial projection will fall into alignment with the axial channel intersecting the radial wall of the enlarged annular recess.

Insertion of a lock cylinder into the steering column lock housing disengages the locking projection from its recess and permits rotation of the lock drive rod element by a key inserted into the rotatable core of the lock cylinder in a normal manner to be positioned in several conditions that are known in the field of steering column locks.

BRIEF DESCRIPTION OF THE DRAWINGS

An embodiment of the steering column lock in accordance with the invention is illustrated in the drawings, where.

DETAILED DESCRIPTION OF THE PREFERRED EMBODIMENT

Figure 1:
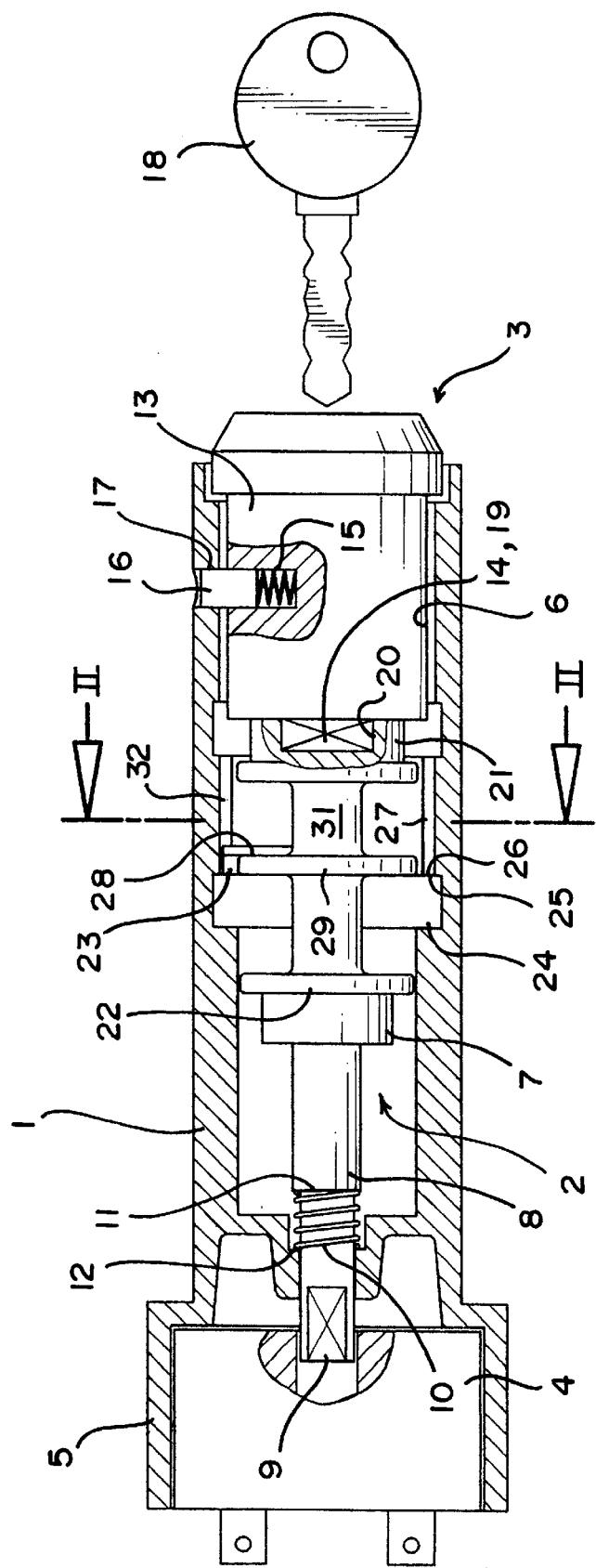
FIG. 1 is a longitudinal section view along line I—I of FIG. 2 in the "locked condition after key withdrawal"

The motor vehicle steering column lock in accordance with the invention comprises a housing 1, a drive rod element 2, a lock cylinder 3, an electric ignition starter switch 4 and a steering shaft locking bolt member (not shown) that cooperates with the drive rod element 2 for locking a motor vehicle steering shaft against rotation.

The ignition starter switch 4 is received in and fixed within an enlarged end section 5 of the steering column lock housing 1 and the lock cylinder 3 is received and mounted in a lock cylinder receiving end of the bore hole 6 of the housing opposite the end of the housing that receives the ignition switch. The drive rod element 2 is mounted in the housing 1 between the lock cylinder 3 and the ignition starter switch 4.

The drive rod element 2 controls the displacement of the steering column locking bolt member between a locked position and unlocked position by means of a cam 7 on the rod and the rod element 2 actuates the ignition starter switch 4 by means of a drive shaft portion 8 which at its free end 9 engages the ignition starter switch 4. The drive rod element 2 is rotatable within the housing 1 and rests therein in an axially displaceable manner, being biased by a helical compression coil spring 10 toward the end of the housing holding the lock cylinder 3. The spring 10 also biases the lock cylinder core 14 of the lock cylinder 3. The helical spring 10 is fitted around the shaft portion 8 and engages an annular shoulder 11 of the shaft portion 8 at one end and an annular shoulder 12 of the steering column lock housing 1 at its other end.

The lock cylinder 3 includes an outer cylinder housing 13 and an inner core 14 that is rotatable by a removable key 18, such rotation also causing axial displacement of the core 14 in a manner that will be explained below. The housing 13 is detachably secured in the steering column lock housing 1 by an axially (relative to the pin itself) displaceable radially extending detent pin 16 biased by a helical compression spring 15, the pin 16 entering a radial bore hole 17 of the steering column lock housing 1. When the core 14 is rotated by the key 18 within the housing 13, the core is axially displaceable and, by means of a non-circular contoured rear end 19, is rotationally coupled to the drive rod element 2 at a recess 20 that has a corresponding non-circular cross-section and an enlarged coupling segment 21 that is larger in diameter than the recess 20.

In operation, in the "locked condition after key withdrawal" as depicted in FIG. 1, the steering shaft lock bolt member that typically is displaceable along its length transversely to the lock drive element 2, assumes a locked position in order to prevent rotation of the motor vehicle steering shaft. The ignition starter switch 4 in this condition cuts off current to the power consuming means of the vehicle. The core 14 of the lock cylinder 3 and the drive rod element 2 are in the first, or outer, axial position whereat the coupling segment 21 of drive rod element 2 axially rests against the end of the cylinder housing 13 of the lock cylinder 3.

Figure 3:
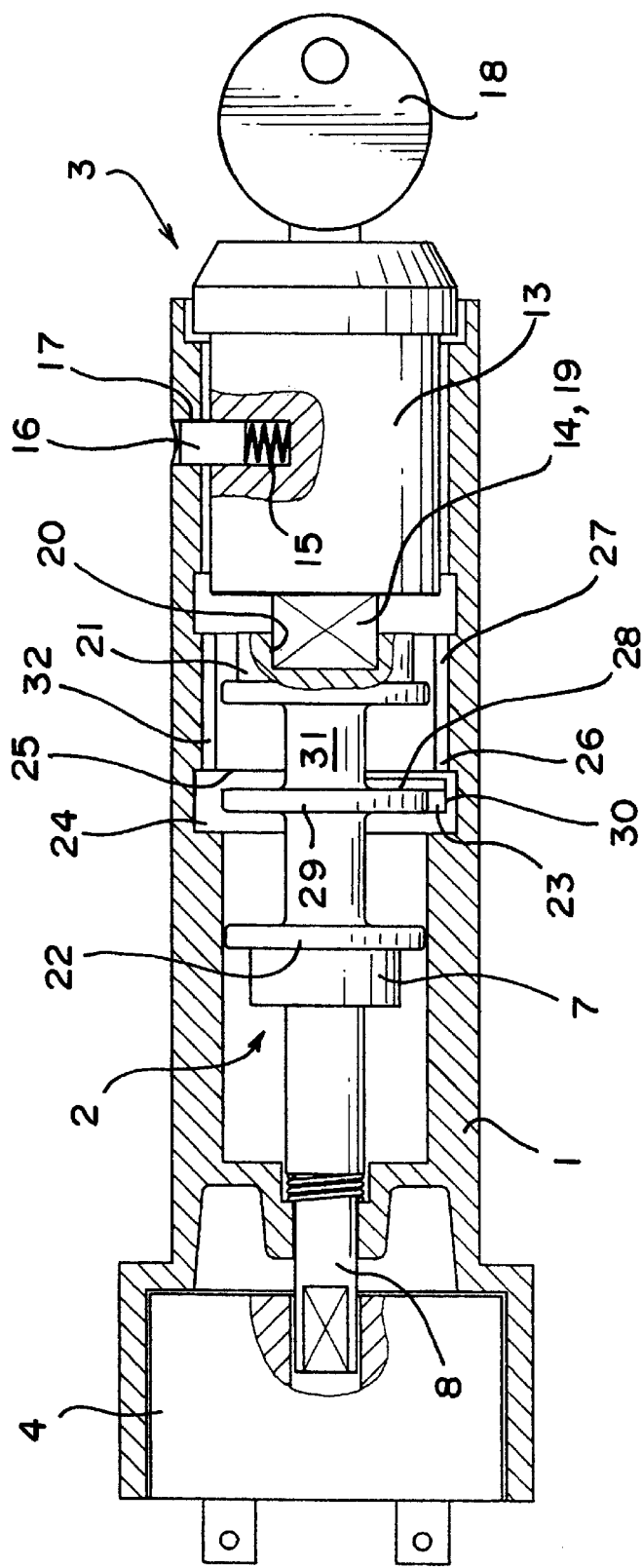
FIG. 3 is a longitudinal section view similar to FIG. 1 with the steering column lock in the "drive" condition.

When the key 18 is inserted into the core 14 of the lock cylinder 3 and rotated, the barrel core 14 and the drive rod element 3 are first axially driven against the force of the helical compression spring 10 seated on the shaft 8 and then rotated 180°, whereupon the cam 7 of the drive rod element 2 will move the steering shaft locking member, which is spring biased normally towards the locked position, against its spring force into an unlocked position, whereby the motor vehicle steering shaft is now rotatable. At a point not later than when the unlocked condition is reached, a spring-loaded securing element (not shown) of the steering shaft locking member will snap over a safety projection 22 of the drive rod element 2, the projection 22 being located adjacent the cam 7 of the drive rod element 2 and having a circular contour. There then results the "drive" condition of the steering column lock as shown in FIG. 3 at which the ignition starter switch 4 has been rotated into the position to close the ignition circuit.

Figure 4:
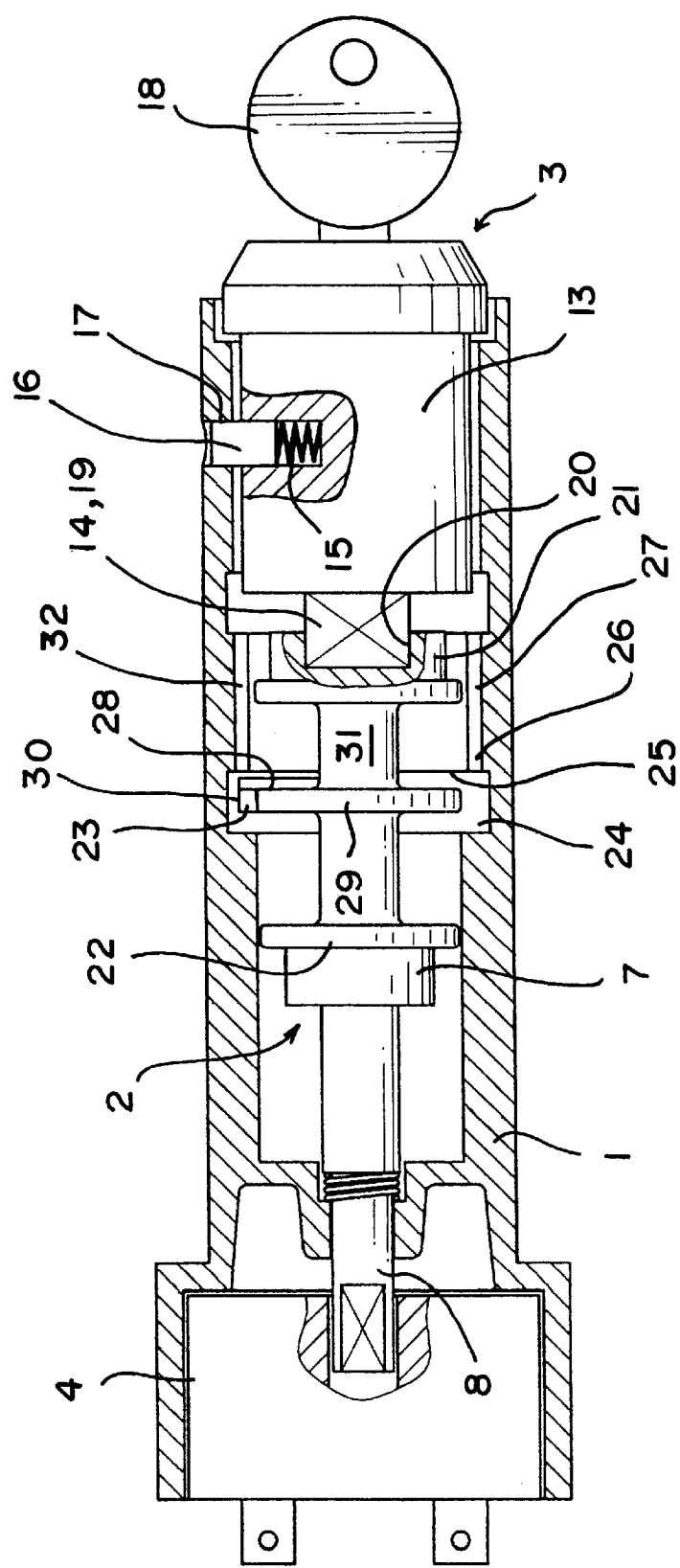
FIG. 4 is a view similar to FIG. 1 with the steering column lock in the "locked condition before key withdrawal"

Rotation of the key 18, the barrel core 14 and the drive rod element 2 back into the initial position leads to the "locked condition before key withdrawal", whereat the steering column lock components are positioned as shown in FIG. 4 and the cam 7 of the drive rod element 2 has released the steering shaft locking member which, however, remains held in the unlocked position due to the securing element of the steering shaft locking member resting on the safety projection 22 of the drive rod element 2. Only after the key 18 has been withdrawn from the cylinder core 14 of the lock barrel 3 will the helical compression spring 10 drive both the drive rod element 2 and the barrel core 14 out of the inner or second axial position as shown in FIG. 4 and into the outer or first axial position as shown in FIG. 1, whereby the safety projection 22 of the drive rod element 2 is moved away from beneath the securing element of the steering shaft locking member and this locking member, yielding to its spring-loading, moves into the locked position.

Figure 5:
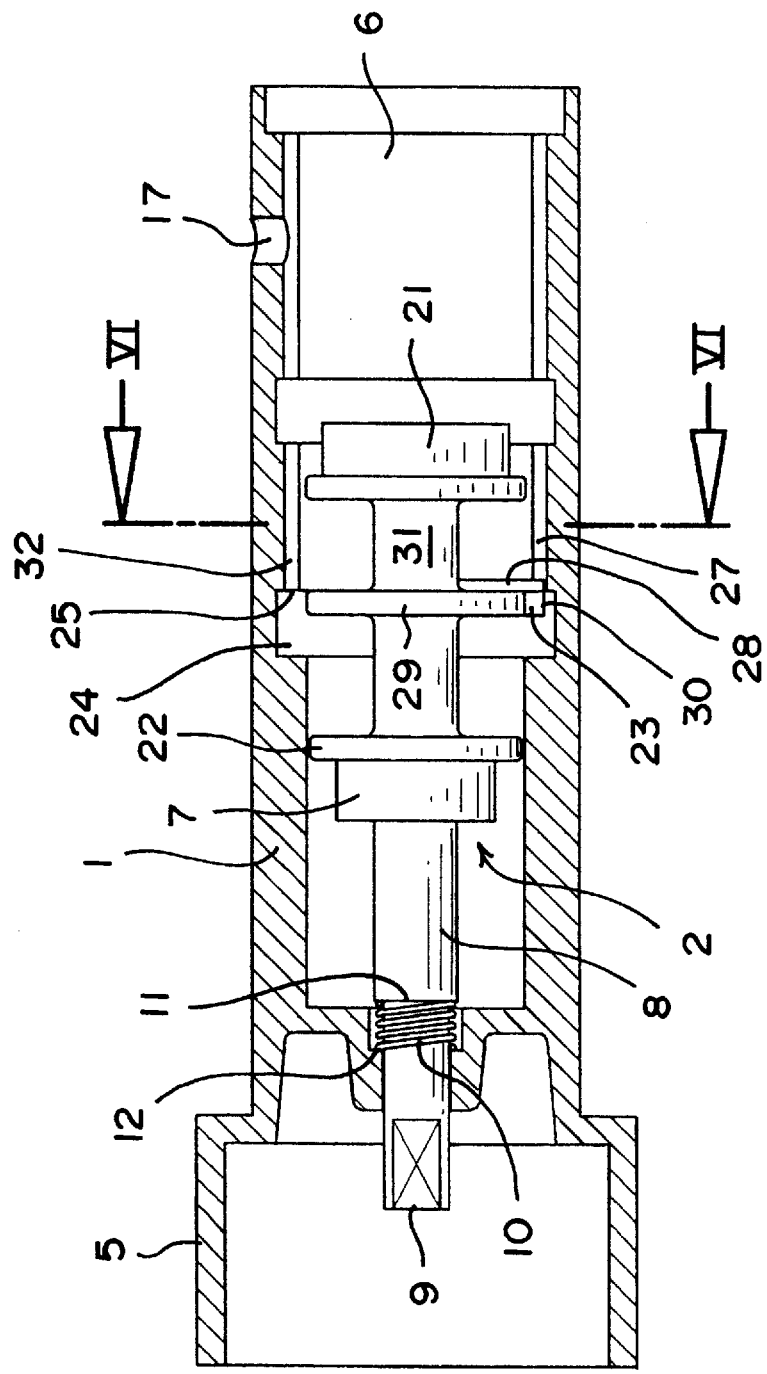
FIG. 5 is a longitudinal section view taken along line V—V of FIG. 6 of the housing of the steering column lock and a drive rod element axially affixed and held against rotation in the housing of the steering column lock.
Figure 7:
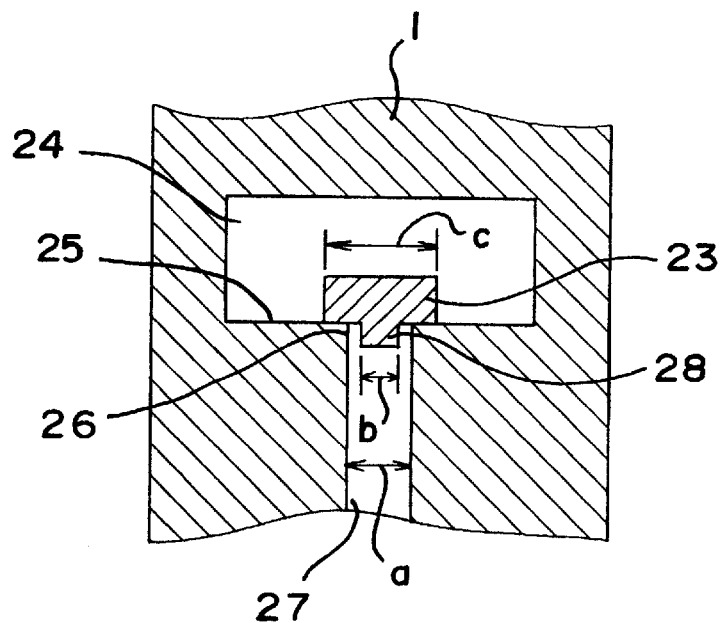
FIG. 7 is a longitudinal section view taken along line VII—VII of FIG. 6.
Figure 6:
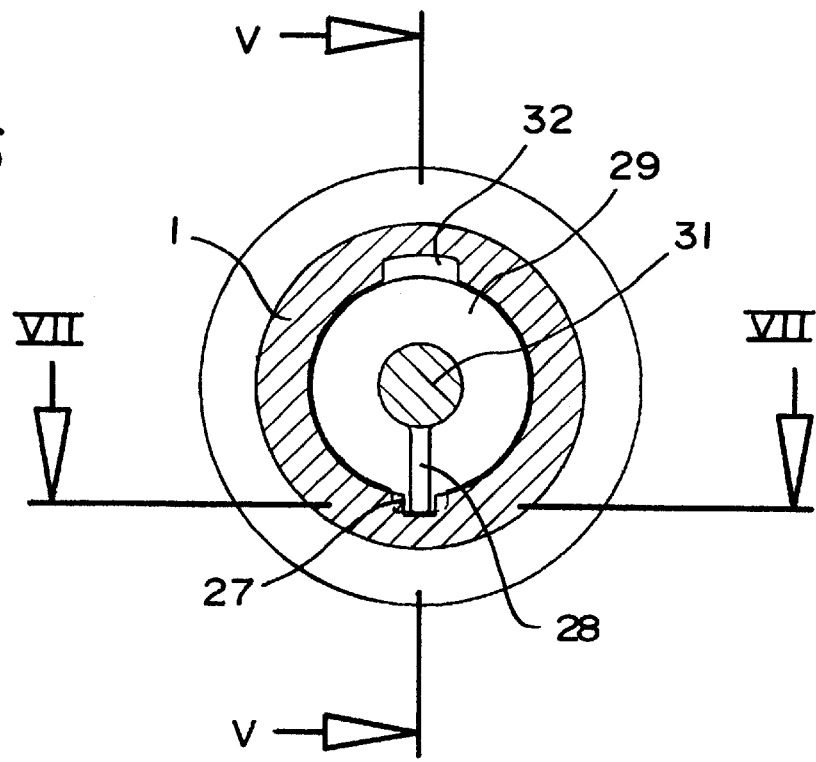
FIG. 6 is a cross-section view taken along line VI—VI of FIG. 5.

To enable storing and shipping of the steering column lock without the lock cylinder 3 and the ignition starter switch 4 assembled thereto, the drive rod element 2 is retained securely in the housing, of the steering column lock in the manner shown in FIGS. 5 through 7. The drive rod element 2 is fitted with a radial projection 23 and the steering column lock housing is fitted with an inner enlarged annular recess 24 located between the ignition switch receiving end and the lock cylinder receiving end of the housing, and into which the projection 23 extends. A radial side wall 25 of the recess 24 facing away from the helical compression spring 10 (and away from the ignition switch receiving end of the housing 1) includes a locking projection receiving recess 26 intersecting the side wall 25 adjacent the bore hole 6 of the housing 1 that receives the lock cylinder 3 as provided. The recess 26 receives an axially extending locking projection 28 that axially projects from the radial projection 23 when the drive rod element 2 is rotated so that the axially extending locking projection 28 is in alignment with the recess 26, which also extends axially. Preferably, the recess 26 is formed by the mouth of an inner longitudinal channel 27 in the steering column lock housing 1 extending axially along the bore of the housing to the side wall 25 of the enlarged annular recess 24.

Figure 2:
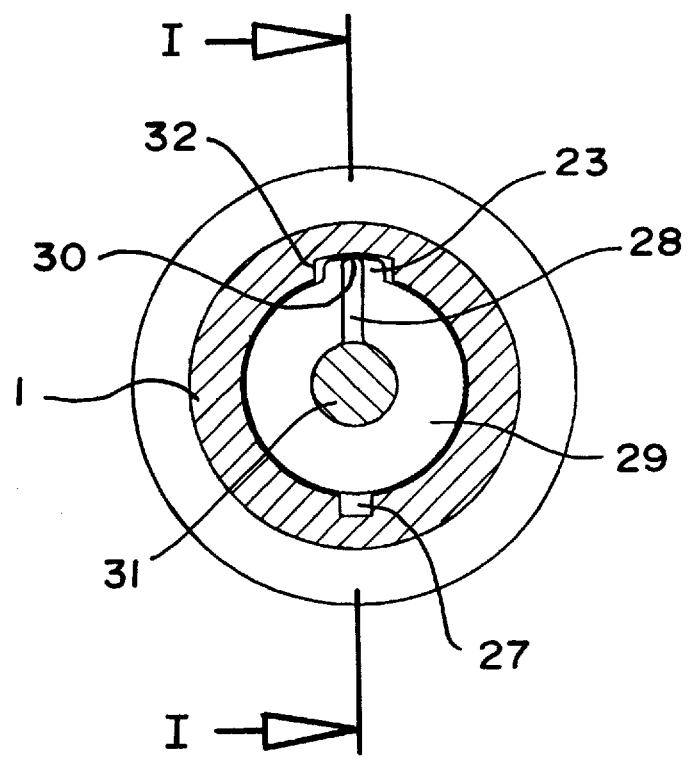
FIG. 2, is a cross-section view taken along line II—II in FIG. 1.

The locking projection 28 on the radial projection 23 of the drive rod element 2 is facing on the side of the projection 23 located away from the helical compression spring 10 and away from the ignition switch receiving end of the housing. The locking projection 28 is narrower than the radial projection 23 as shown in FIGS. 2, 6 and 7. As shown particularly in FIG. 7, the width "a" of the inner longitudinal channel 27 of the housing 1 is only slightly larger than that width "b" of the locking projection 28 of the radial projection 23 of the drive rod element 2, and the width "c" of the projection 23 is substantially larger than the width "a" of the inner longitudinal channel 27 of the steering column lock housing 1.

The projection 23 of the drive rod element 2 radially projects from a discoidal drive rod element segment 29 which projects radially from the drive rod element 2 and is mounted between the coupling segment 21 and that portion of the drive rod element that cooperates with the steering shaft locking member, in this case cam 7 and the safety projection 22. The locking projection 28 thus extends as a radial strip from the outer edge 30 of the projection 23 and radially along the segment 29. Rod portion 31 of drive rod element 2 connects the segment 21 to segment 29.

When the drive rod element 2 is assembled into the bore 6 of the steering column lock housing 1, the radial projection 23 of the drive rod element 2 moves along an inner axially extending longitudinal channel 32 in the bore of the housing that extends from generally the lock cylinder end of the housing to the enlarged annular recess 24 of the housing. The channel 32 is slightly wider than the radial projection 23, as shown in FIG. 2, and is preferably offset by 180° relative to the recess 26 in the bore of the housing.

When it is desired to ship or store the steering column lock mechanism without the lock key cylinder 3, and perhaps without the ignition switch 4, the drive rod element 2 is inserted into the bore 6 of the housing 1 with the radial projection 23 aligned with the longitudinal channel 32 to enable axial movement of the drive rod element 2 into position within the bore such that the radial projection 23 extends into the enlarged annular recess 24 of the bore. Thereafter, the projection 23 and the locking projection 28 are rotated 180° such that the locking projection is aligned with the locking projection receiving recess 26 in the bore of the housing. The spring 10, which is already assembled on the shaft 8, is then permitted to bias the drive rod element 2 axially towards the lock cylinder receiving end of the housing such that the locking projection 28 extends into recess 26 to lock the drive rod element 2 against relative rotation in the housing 1. In this condition, the drive rod element 2 is safely secured in the bore of the housing against rotational and consequent axial displacement relative to the housing.

To restore operability of the drive rod element 2, the lock cylinder 3 (and the ignition switch 4, if it has not already been installed) are installed in the housing 1 and the key 18 is inserted to cause axial and rotational displacement of the lock drive element 2 into the various conditions described previously.

It will be noted from the drawings that the locking projection 28 does not engage the recess 26 until the lock cylinder 3 is removed from the housing.

The axial motion of the drive rod element 2 out of the enlarged annular recess 24 is normally prevented by interference between the radial projection 23 and the radial wall 25 of the recess 24, except when the projection 23 is aligned with the recess 32 (see, for example, FIGS. 1 and 2).

It will be understood that the exemplary embodiment described is illustrative only and it will be understood that those skilled in the art could vary the details of the examples given without departing from the scope of the invention as defined in the appended claims.

What is claimed is:

1. A motor vehicle steering column lock for cooperating with a steering shaft locking member comprising:
   a housing including an axial bore, an ignition switch receiving area at one end of the housing and a lock cylinder receiving area at the opposite end of the housing, the lock cylinder receiving area forming an extension of the axial bore;
   a peripheral annular enlarged recess along the bore between the ignition switch receiving and lock cylinder receiving areas of the housing, the annular recess including at least a radial wall on the side thereof away from the ignition switch receiving area of the housing;
   an axial channel extending along a side wall area of the bore extending generally from the lock cylinder receiving area of the housing to the annular enlarged recess, said channel intersecting said radial wall of the annular enlarged recess;
   a locking projection engaging recess in the housing also intersecting the radial wall of the enlarged annular recess at a point circumferentially spaced from the intersection of said channel with said radial wall;
   a drive rod element supported in the bore for axial and rotational motion;
   a radial projection on said drive rod element and projecting radially into said enlarged annular recess;
   said channel having a width sufficient to accommodate axial passage of said radial projection along the bore when the drive rod element is axially inserted into the bore from the lock cylinder receiving end Of the housing;
   said radial projection being restrained from axial motion beyond said radial wall of said enlarged annular recess in the direction of the lock cylinder receiving end of the housing by interference between the radial wall and the radial projection except when said radial projection is aligned with said channel;
   a locking projection associated with the radial projection and engageable with said locking projection engaging recess when said radial projection is not aligned with said channel and said locking projection is aligned with said recess; and
   a spring element for biasing the drive rod element away from the ignition switch receiving area of the housing;
   whereby said drive rod element may be retained against rotation in the housing by the locking projection engaging the locking projection recess, and against axial motion in the housing toward the lock cylinder receiving end of the housing by interference between said radial projection and said radial wall of said enlarged annular recess.

2. The steering column lock according to claim 1, wherein said locking projection engaging recess is defined at least partly by a second axially extending channel in the side wall of said bore, said second channel intersecting said enlarged annular recess.

3. The steering column lock according to claim 1, wherein said locking projection comprises an axial projection located on said radial projection.

4. The steering column lock as claimed in claim 1, wherein said axial channel and said locking projection engaging recess are circumferentially spaced 180° apart on said radial wall of said annular enlarged recess.

5. The steering column lock according to claim 2, wherein said locking projection is smaller in width than said second channel and the width of the radial projection is greater than the width of said second channel.

6. The steering column lock according to claim 1, including a discoid member on said drive rod element, said radial projection radially projecting from said discoid element.

7. The steering column lock according to claim 1, said spring element comprising a coil spring located adjacent the ignition switch receiving end of the housing and extending coaxially with said drive rod element.

8. The steering column lock according to claim 1, said drive rod element including a steering shaft locking member actuator portion and a coupling segment that transmits rotational and axial motion between a lock cylinder core associated with a lock cylinder locatable in the lock cylinder receiving end of the housing and the drive rod element, said radial projection being disposed between said steering shaft locking member actuator portion and said coupling segment.

* * * * *